United States Patent
Funk, Jr.

[15] 3,693,015
[45] Sept. 19, 1972

[54] SYSTEM FOR MONITORING AIR VORTICES COMPRISING PLURAL SCHLIEREN DETECTORS WITH OUTPUT SIGNALS ADDED AND RMS VALUE OF SUM PRODUCED FOR INDICATION OF TURBULANCE

[72] Inventor: Buford H. Funk, Jr., 213 Wingate Ave. S.W., Huntsville, Ala. 35801

[22] Filed: Jan. 8, 1971

[21] Appl. No.: 104,882

[52] U.S. Cl. ..................250/209, 250/218, 340/25, 356/129
[51] Int. Cl. ......G01n 21/26, G01n 21/46, G08g 5/00
[58] Field of Search ........340/25, 228; 356/129, 106; 250/218, 209, 220

[56] References Cited

UNITED STATES PATENTS

| | | | |
|---|---|---|---|
| 2,968,209 | 1/1961 | Aulin | 356/129 X |
| 3,299,769 | 1/1967 | Byers | 250/218 X |
| 2,856,811 | 10/1958 | Kaye | 250/218 X |

OTHER PUBLICATIONS

Universal Type Laser Interferometer JL1–01, Japan Electron Optics Laboratory Co. Ltd., Publication No. 64719– L5K6 pages 1– 5 and 8 relied upon

*Primary Examiner*—James W. Lawrence
*Assistant Examiner*—T. N. Grigsby
*Attorney*—L. D. Wofford, Jr., C. C. Wells and John R. Manning

[57] ABSTRACT

A laser schlieren system provides a means for monitoring the strength of air disturbances such as vortex wakes near aircraft runways. A plurality of lasers and a plurality of photodetectors are located on opposite sides of a runway or its approach flight path whereby each laser directs a laser beam perpendicular to the path of the aircraft into a photodetector. The photodetector has a knife edge placed in front of it whereby the schlieren deflections of the beam by air disturbances causes a definite change in the electrical signal from the photodetector which change indicates the degree of disturbance.

5 Claims, 8 Drawing Figures

PATENTED SEP 19 1972 3,693,015
SHEET 1 OF 3
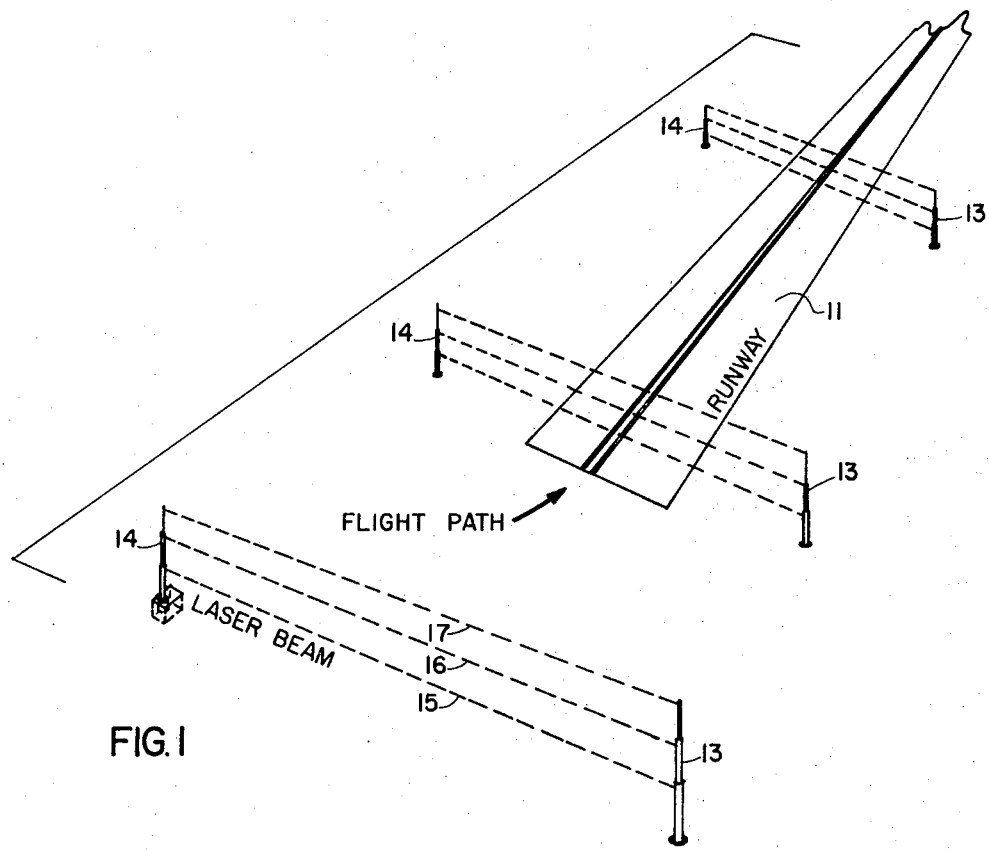
FIG. 1
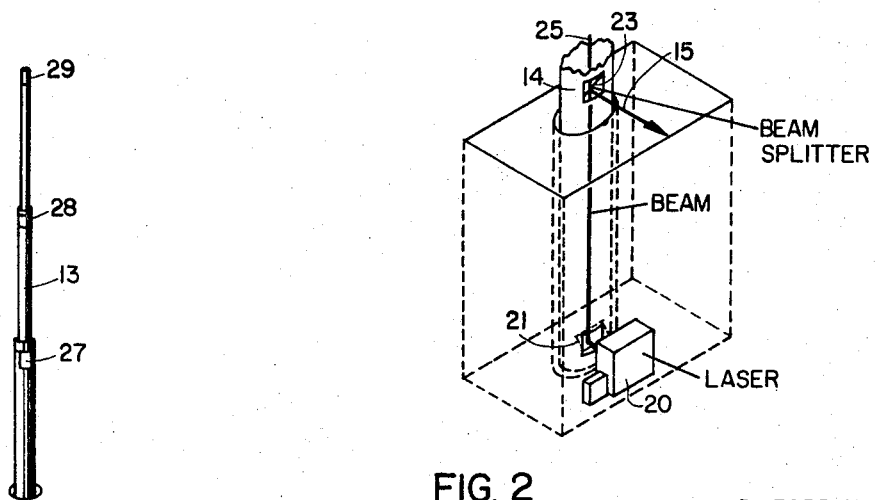
FIG. 2A
FIG. 2
BUFORD H. FUNK, JR.
INVENTOR
BY *[signature]*
ATTORNEY

BUFORD H. FUNK, JR.
INVENTOR

BY *Leon D. Wofford, Jr.*
ATTORNEY

BUFORD H. FUNK, JR.
INVENTOR

BY *Leon D. Wofford, Jr.*
ATTORNEY

SYSTEM FOR MONITORING AIR VORTICES COMPRISING PLURAL SCHLIEREN DETECTORS WITH OUTPUT SIGNALS ADDED AND RMS VALUE OF SUM PRODUCED FOR INDICATION OF TURBULENCE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The invention relates to an apparatus and method for measuring air turbulence and more specifically to a laser net system for monitoring the strength of vortex wakes left by airplanes on or near airport runways.

2. Description of the Prior Art

A landing or ascending airplane creates air vortices which can present a hazard to the next airplane which lands or takes off, particularly if the first airplane is large and the second airplane is small. It is now known that the air vortices are associated with the wingtips of the airplane and can create unsafe conditions for landing or take-off for several minutes. While the vortices decay and move off the runway with time, uncontrollable variables, such as cross wind speed, can influence their duration. Therefore, for more efficient and safer utilization of a runway, a monitoring system is needed to determine when conditions are safe for take-off or landing, but none has herebefore existed.

SUMMARY OF THE INVENTION

The present invention utilizes a net of laser beams passing over the runway, and the schlieren deflections of each of the beams are monitored by a photodetector, and the resulting fluctuating signals are electronically added. The composite signal is amplified and its root-mean-square (RMS) value is computed. The magnitude of the RMS value of the composite signal is used to indicate whether or not unsafe conditions exist on the runway.

Accordingly, it is an object of the present invention to provide a system for monitoring air turbulence adjacent an airplane runway.

Another object is to detect strong wingtip vortices left over a runway by an airplane.

These and other objects and advantages of the invention will become apparent upon reference to the following detailed description, claims and drawings.

BRIEF DESCRIPTION OF THE DRAWINGS

FIG. 1 is a view showing the laser net system of the present invention along an airplane runway.

FIG. 2 is an enlarged view of a pole base showing the laser source.

FIG. 2A is an enlarged view of a pole containing the photodetector.

DESCRIPTION OF THE PREFERRED EMBODIMENT

Figure 3:
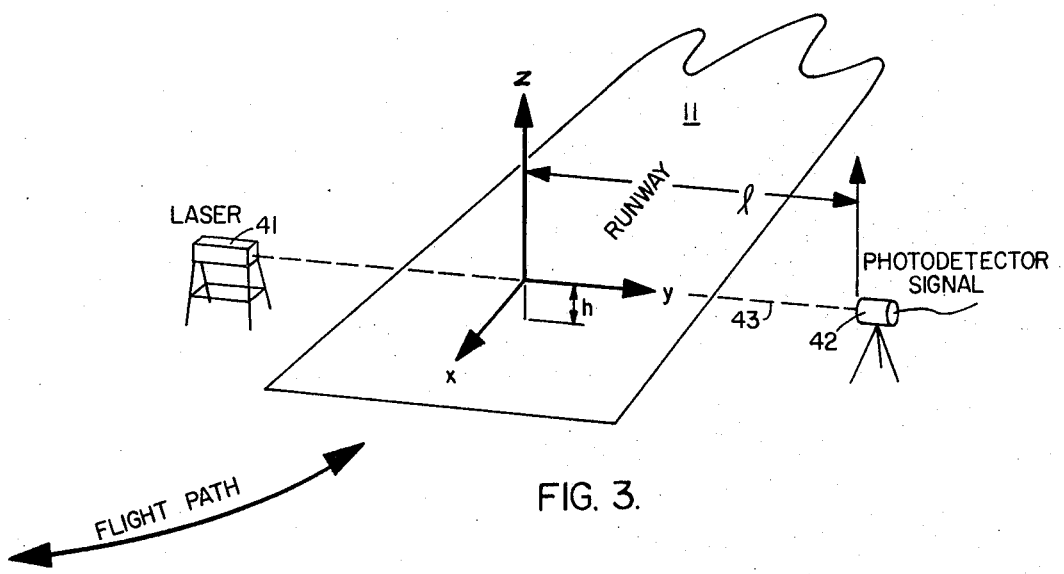
FIG. 3 is a schematic illustration of the relationship between a laser source and a photodetector along a runway.

Referring now to FIG. 1 wherein is illustrated an airplane runway 11 with three pairs of retractable telescoping poles 13, 14 along its length and glide or approach flight path. The centerline of the runway extends between each pair of poles 13, 14. One pole 14 of each pair contains a laser apparatus with mirrors and beam splitters to project a series of laser beams 15, 16, 17 across the runway path toward a series of photodetectors contained in the other pole 13.

FIG. 2 is an enlarged view of the laser apparatus 20 located at ground level of the pole 14 which projects a collimated laser light beam 15 which is reflected along the centerline of the pole 14 by a mirror 21. There are intermediate beam splitters 23 and another end mirror, see FIG. 7, to project the last laser beam 17, so the laser beam is split into three distinct beams 15, 16, 17 (see FIG. 1) which are projected across the runway path at different heights toward a pole 13 containing photodetectors 27, 28 and 29, with each photodetector receiving one beam. The photodetectors 27, 28 and 29 each have a knife edge placed in front of a photodiode whereby the schlieren deflections of the beams caused by air turbulence result in a definite change in the electrical signal from the photodetector, which change indicates the degree of disturbance. The photodetectors 27, 28 and 29 may be such as disclosed in copending patent application Ser. No. 873,793, filed Nov. 4, 1969, for "Optical Probing of Supersonic Flows with Statistical Correlation," invented by Buford H. Funk, Jr. and assigned to the U.S. Government.

FIG. 3 is a schematic illustration of the paired laser 41 and photodetector 42 on opposite sides of a runway. The laser beam 43 is directed over the runway 11 at a known height, $h$, perpendicular to the path of an aircraft, and into the photodetector. The path of the beam 43 from the laser 41 to the detector 42 is a straight line only when the air is undisturbed (i.e., there are no density gradients along the beam path). This is because the speed of light, $v$, depends on the properties of the medium through which it is traveling. For air the relationship is $$n - 1 = \alpha \rho \qquad 1.$$

where:
$n$ is the refractive index,
$\rho$ is the density of the air
$\alpha$ is a constant The refractive index is defined as the ratio of the speed of light in a vacuum, $c$, to the speed in some medium, $v$.

$$n = c/v. \qquad 2.$$

Figure 4:
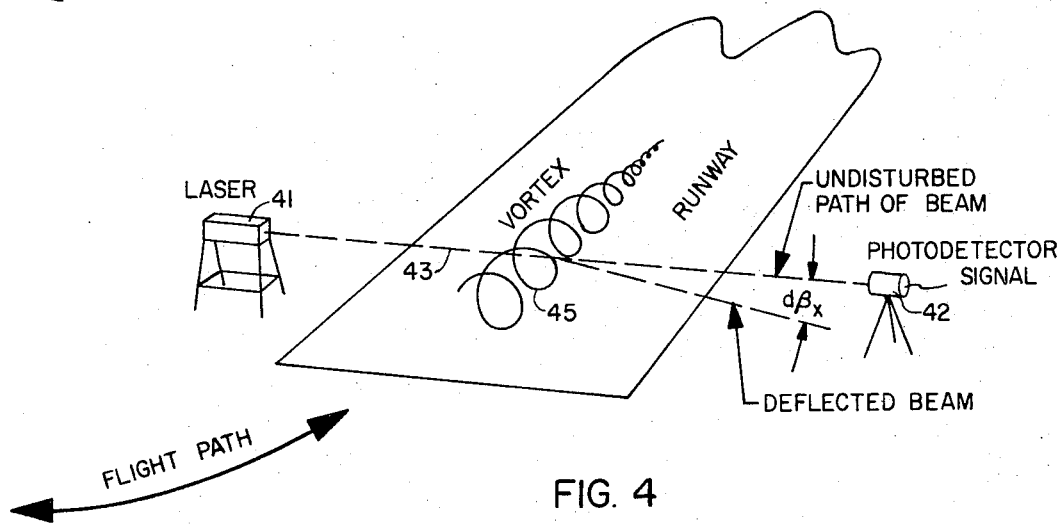
FIG. 4 is a schematic illustration similar to FIG. 3 showing the deflection of the laser beam by a wingtip vortex.

If during its transit from laser 41 to detector 42 the beam 43 encounters disturbances 45 (see FIG. 4) characterized by density gradient fluctuations, the laser beam 43 will be deflected, $d\beta$, from its undisturbed path. The magnitude of the deflection is related to the magnitude of the density gradient fluctuations encountered. The local incremental angular deflection in a plane which includes the beam density gradient vector is given by $$d\beta = 1/n \, (N \cdot \Delta n) \, dy \qquad 3.$$

where:
N is a unit vector normal to the beam and in the plane in which $d\beta$ is measured.
y is a coordinate parallel to the beam and perpendicular to the coordinate x.
n is the refractive index.

The component of the incremental angular deflection of the beam in the x–y plane is given by $$d\beta_x = (1)(n)(\delta n)/(\delta) \, dy). \qquad 4.$$

To determine the total angular deflection of the beam in the horizontal plane, $\beta_x$, equation (4) must be integrated along the entire path of the beam.

$$\beta_x = \int_{-1}^{1} \frac{1}{n} \frac{\partial n}{\partial x} dy \qquad (5)$$

It is desirable to express $\beta_x$ in terms of air density instead of refractive index. Thus from equation (1)

$$(\delta n)/(\delta x) = (\alpha)(\delta \rho)/(\delta x). \qquad 6.$$

Using the fact that n for air is very near unity (n=1.000,292), equation (5) can be simplified:

$$\beta_x \doteq \int_{-1}^{1} \frac{\partial n}{\partial x} dy \qquad (7)$$

Substitution of equation (6) into equation (7) yields $$\beta_x \doteq \alpha \int_{-1}^{1} \frac{\partial \rho}{\partial x} dy \qquad (8)$$

Equation 8 shows that the angular deflection of the laser beam, in the horizontal plane, is directly related to the integral along the entire beam length of a component of the density gradient which is produced by an "invisible" disturbance. Further, the magnitude of the deflection increases with the magnitude of the disturbance.

Figure 5:
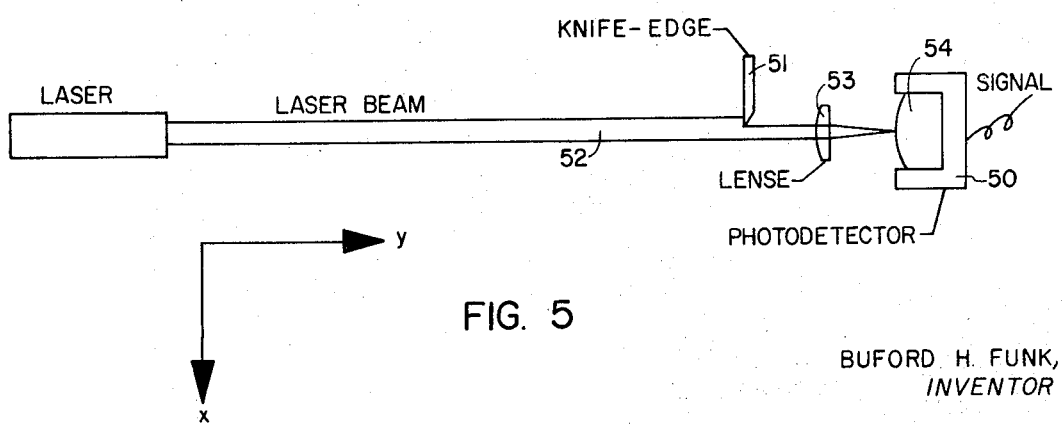
FIG. 5 is a schematic illustration of a laser schlieren system.

FIG. 5 is a schematic of the method by which laser beam deflections can be monitored. The photodetector 50 is composed of a knife edge 51 which is positioned such that approximately 50 percent of the beam 52 is blocked when the beam is in its undisturbed position, a lens 53 for focusing on the photodiode 54 that part of the beam 52 passing the knife edge, and a photodiode 54 for monitoring the radiative power of that portion of the laser beam reaching it.

Figure 6:
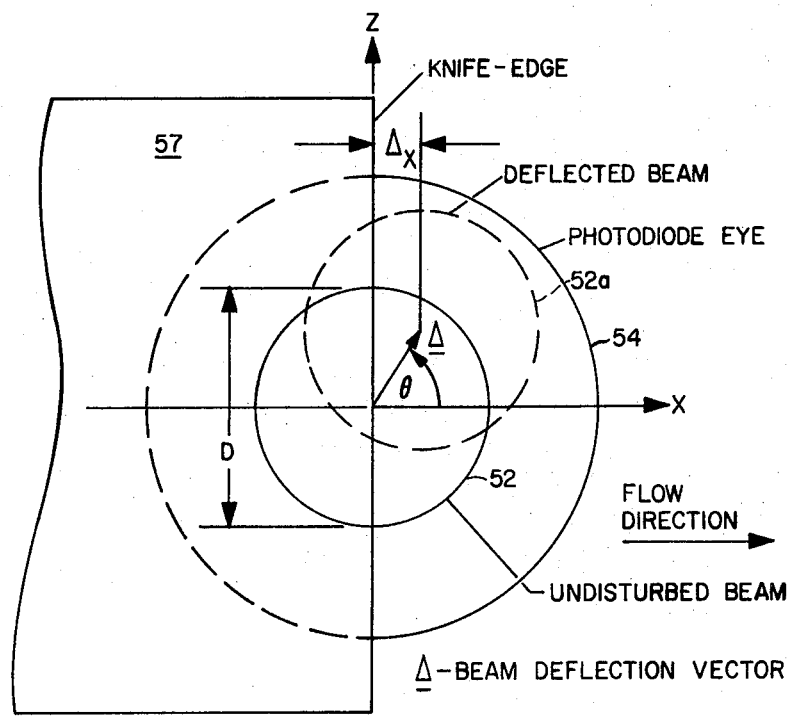
FIG. 6 is a typical cross-section through the beam of the laser schlieren system for FIG. 5.

FIG. 6 is a view along the laser beam 52 from the laser toward the detector and shows the knife edge 57, the photodiode eye 54, and the laser beam cross section 52, in both its undisturbed and typically disturbed or deflected positions 52a (broken line). It can be assumed that the deflections of the laser beam 52, as seen by the knife edge 57, are small compared to the diameter of the beam, D. As a disturbance crosses the beam 52, the beam 52 is deflected. Due to the presence of the knife edge 57, the deflection will result in a change in the radiative power reaching the photodiode eye 54. The change, or fluctuation, may be either positive or negative depending upon the direction of the deflection.

Let $\Delta x$ be the x-component of the beam deflection at the knife edge 57. Then $$e(t) = [4E/\pi D] \, \Delta x(t) \qquad 9.$$

where:
$e(t)$ is the fluctuating signal voltage
D is the diameter of the beam,
E is the signal voltage from total beam cross section.

Now, the differential displacement of the beam 52 at the knife edge 57 due to a differential angular deflection of the beam at a distance, r, from the knife edge is $$\Delta x = r \cdot d\beta_x. \qquad 10.$$

Integrating equation (10) along the beam using equations (4) and (6), yields $$\Delta x = \alpha \int_{-1}^{1} r \frac{\partial \rho}{\partial x} dy \qquad (11)$$

Substituting equation (11) into (9) yields $$e(t) = [4E/\pi D] \alpha \int_{-1}^{1} r \frac{\partial \rho}{\partial x} dy \qquad (12)$$

Now let $$s = (4E)/(\pi D \cdot r \qquad 13.$$

where:
s is the sensitivity of the system. Then equation 12 becomes $$e(t) = \alpha \int_{-1}^{1} s \frac{\partial \rho(y, t)}{\partial x} dy \qquad (14)$$

The time dependence of the signal is a result of time-varying disturbance passing through the beam.

The root-mean-square (RMS) value of $e(t)$ is:

$$e_{RMS} = \sqrt{\overline{e^2}}. \qquad 15.$$

By having a plurality of laser beams as indicated by FIG. 1 a continuous gross picture of the intensity of disturbances over the entire runway can be obtained. What is shown is a "laser net" in which each beam in the net is essentially the same as the single beam discussed above. Although the "laser net" appears to be a much more complicated system than the single beam, this is not actually the case. By connecting the outputs of all detectors in the net, the entire area covered by the net can be monitored from one signal, $e_T$.

$$e_T = e_1 + e_2 + e_3 + \ldots + e_m \qquad 16.$$

$$e_T = \sum_{k=1}^{m} e_k \quad (17)$$

and $$\overline{e_T^2} = \sum_{k=1}^{m} \overline{e_k^2} + \sum_{k=1}^{m} \sum_{l=1}^{m} \overline{e_k e_l}, \quad (k \neq l) \quad (18)$$

Because the density gradient fluctuations are expected to be produced by small scale random temperature inhomogeneities which are uncorrelated over long distances, the quantity $$\overline{e_k e}$$

should be zero. Then, equation (17) becomes $$\overline{e_T^2} = \sum_{k=1}^{m} \overline{e_k^2} \quad (18)$$

where:
$m$ is the number of beams in the net. Taking the square root of both sides of equation (18) gives $$e_{T_{RMS}} = \left[ \sum_{k=1}^{m} \overline{e_k^2} \right]^{1/2} \quad (19)$$

Equation 19 shows that it is just as easy to monitor a net of laser beams as it is to monitor one.

Figure 7:
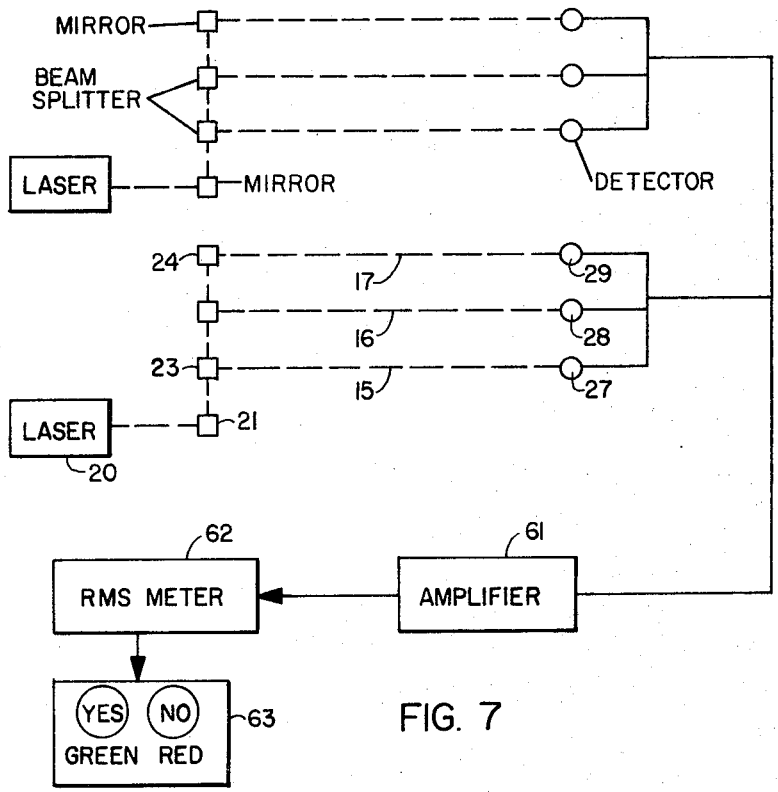
FIG. 7 is a schematic of the instrumentation for the laser net of the present invention.

FIG. 7 is a schematic of the laser net instrumentation for two of the paired poles of FIG. 1. The photodetectors' signals are amplified by amplifier 61 and their RMS value obtained with an RMS meter 62 (e.g., a Ballantine True RMS Meter Model 320A). The RMS meter 62 may if desired have a panel 63 with one red light and one green light to indicate when the RMS value of the signal (intensity of the disturbance) is above or below some established critical value. The magnitude of RMS value of the schlieren signal on a cool calm day would be considerably less than it would be on a hot windy day; however, on either day a wingtip vortex intersecting the beams would produce a sudden rise in the RMS signal.

What is claimed is:
1. A laser net system for monitoring air turbulance along a path, comprising:
    laser means adjacent one side of a path for projecting a plurality of distinct collimated light beams across said path,
    detection means adjacent the other side of said path for detecting the schlieren deflections of each of said light beams and for producing a plurality of distinct electrical signals, each signal indicative of the schlieren deflections of one of said light beams, and
    monitoring means for electrically adding said electrical signals from said detection means and for producing a root-mean-square readout signal of the added electrical signals which is indicative of the magnitude of the air turbulence along said path.
2. A laser net system according to claim 1 wherein said path is defined by an airplane runway and includes:
    a pair of retractable poles, one pole on each side of said airplane runway, and
    said laser means associated with one of said poles and said detection means associated with the other of said poles.
3. A laser net system according to claim 2 wherein said beams are at different heights across said path.
4. A laser net system for monitoring airplane wingtip air vortices on and near airport runways, comprising:
    a plurality of laser means located along a side of a runway path, each laser means projecting a plurality of distinct collimated light beams across said runway path,
    a plurality of detection means located along the opposite side of said runway path, each detection means including a plurality of photodetector means for receiving said plurality of light beams projected by one of said laser means, each photodetector means producing a distinct electrical signal indicative of schlieren deflections of one light beam,
    monitoring means for electrically adding said electrical signals from said photodetector means and for producing a root-mean-square readout signal of the added electrical signals which is indicative of the magnitude of the air vortices passing through said light beams.
5. A laser net system according to claim 4, wherein each said laser means is associated with a retractable pole extending upwardly from one side of said runway path, and each said detection means is associated with a retractable pole extending upwardly from the opposite side of said runway path.

* * * * *